No. 11,941. Reissued Oct. 22, 1901.

T. N. THOMSON.

DISINFECTING APPLIANCE.

(Application filed Apr. 11, 1901.)

Witnesses.
Robt. Scott.
W. B. Keep

Inventor.
Thomas N. Thomson.
By James G. Norris
Atty.

UNITED STATES PATENT OFFICE.

THOMAS N. THOMSON, OF SCRANTON, PENNSYLVANIA.

DISINFECTING APPLIANCE.

SPECIFICATION forming part of Reissued Letters Patent No. 11,941, dated October 22, 1901.

Original No. 668,762, dated February 26, 1901. Application for reissue filed April 11, 1901. Serial No. 55,418.

*To all whom it may concern:*

Be it known that I, THOMAS N. THOMSON, a citizen of the United States, residing at Scranton, in the county of Lackawanna and State of Pennsylvania, have invented certain new and useful Improvements in Disinfecting Appliances, of which the following is a specification, reference being had therein to the accompanying drawings.

This invention relates to plumbing accessories; and the object of the invention is to provide a convenient and economical device for diffusing disinfectant through the plumbing system of the habitation where it is used.

To this end the invention consists of the construction, arrangement, and combination of the several parts herein described, and illustrated in the accompanying drawings, in which—

Figure 1:
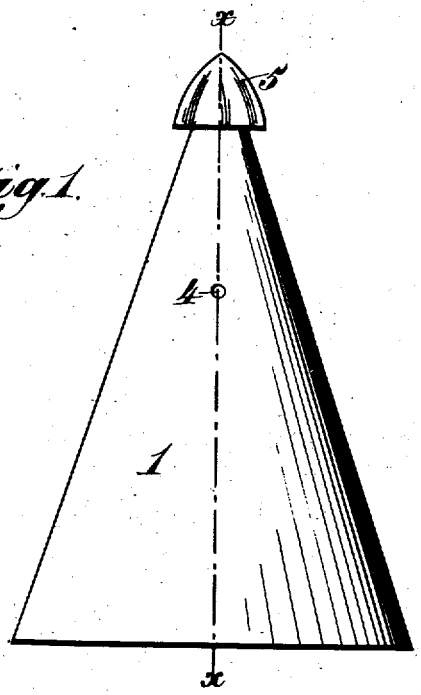
Figure 2:
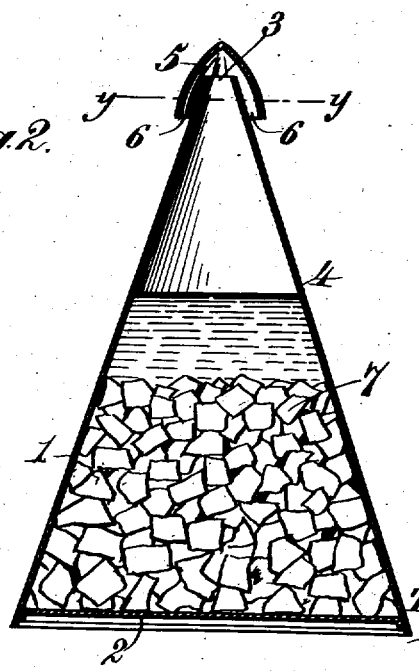

Figure 1 is a side elevation of my disinfecting appliance when set in the upright position for use. Fig. 2 is a cross-section taken on the line *x x* of Fig. 1.

In the drawings, 1 designates a can or receptacle conical in form, preferably made of tin, and provided near its base with a bottom 2, which is designed to be soldered into its place after the disinfecting salts are placed within. The said disinfecting salts may be cast or molded into cakes in the shape of a frustum of a cone, so that they can be readily placed within by hand during the making of the device. The upper end of the can has an opening 3, designed as an air-passage, and intermediate of the base and the top is a small water-passage 4. The opening 3 is covered with a hood 5, which is suitably attached near the apex of the conical can, leaving air-passages downward at 6 6, which passages, opening below the level of 3, are designed to form an air-trap when the can is submerged.

The operation of the device is as follows: The receptacle of the can is filled about three-fourths full with permanganate of potassium or any other suitable disinfecting salts. I prefer permanganate of potassium, among other reasons, because of the coloring which it gives to the water in which it is used, thus evidencing the diffusion of the disinfectant, so that replenishment may be attended to when the coloring is less noticeable. The can, with its contents, is designed to be set upright on the bottom of a flushing-tank, such as is used in modern lavatories and closets. When the water fills up in the tank, it passes in through the opening 4, filling the space there may be in the can and dissolving some of the disinfecting salt 7. When the device is fully submerged, the water will stand within the hood about on the level of the line *y y*, thus sealing the passage 3 against any circulation of water therethrough. This is a provision against wasting of the disinfectant, since if the passage 3 were left open the liquid within the upper part of the can becoming heavier with the solution would pass outward at 4 gradually and diffuse the contents continually through the flushing-tank. By preventing the said circulation through the openings the device may sit in a flushing-tank for an unlimited amount of time without diffusing any appreciable amount of the disinfectant, except when the water is drawn from the tank as it is casually used. It will be readily seen that when the water is drawn from the tank or when it sinks below the level of the opening 4 the solution will discharge into the water of the tank until it sinks to the level of the opening 4. In this way a small or limited portion of solution of the contents of the can is diffused into the flushing-tank every time that it is drawn off, and it is evident that the oftener it is drawn off the less length of time it will have for becoming a strong solution, and hence will not waste the disenfectant by being drawn frequently; but if it is not used so frequently the solution becomes stronger, and consequently more effective, which is a condition of things desirable, so that a certain amount of disinfecting will be accomplished in any event and the disinfectant not needed is preserved from waste when the tank is not used.

I do not wish to be confined to the exact construction shown in the drawings, as it is evident that the details of my invention may be varied without departing from the spirit of the invention. For example, the receptacle might be made any shape instead of cone-shaped, as shown and described.

Having thus described my invention, what I claim as new, and desire to secure by Letters Patent, is—

1. As a new article of manufacture, a disinfecting device comprised in a cone-shaped receptacle adapted to be immersed in a flushing-tank and having a perforation in the side thereof adapted to serve as a passage for water therethrough and a perforation in the apex of the cone, the said perforation covered with an air-tight hood, the sides thereof extending downward substantially parallel to the convex sides of the cone, and permitting passage of air between the hood and the walls of the cone and adapted to be sealed by the water when the cone is set upright on its base in water whose level rises above the level of the lower edges of the hood aforesaid, the said receptacle adapted to contain any suitable disinfecting salt to be diffused by solution into the water making ingress and egress of the said receptacle during the operation of the device, substantially as specified.

2. A disinfecting device consisting of a receptacle adapted to contain a disinfecting substance and to be immersed in a flushing-tank and provided with two openings, one higher than the other, the lower one for the passage of water in and out, and the upper one for the passage of air and a trap for the upper opening adapted to be sealed by water when the same rises in the tank to the trap.

3. A disinfecting device consisting of a receptacle adapted to be immersed in a body of water and to contain a disinfecting substance, the said receptacle having a water-passage therein and an opening above said passage, and a hood whose sides extend downwardly and inclose said opening forming an air-passage between the walls thereof and said receptacle adapted to be sealed by the water in which the receptacle is immersed when the level of the same rises above the lower edge of the hood.

In testimony whereof I affix my signature in the presence of two witnesses.

THOMAS N. THOMSON.

Witnesses:
WM. M. STOCKBRIDGE,
HEATH SUTHERLAND.